(12) United States Patent
Honhoff et al.

(10) Patent No.: US 7,861,583 B2
(45) Date of Patent: Jan. 4, 2011

(54) WIND TURBINE ANEMOMETRY COMPENSATION

(75) Inventors: Saskia G. Honhoff, Salzbergen (DE); Donald M. Rogers, Greer, SC (US); Felix C. Landwehr, Lohne (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/015,569

(22) Filed: Jan. 17, 2008

(65) Prior Publication Data

US 2009/0183576 A1      Jul. 23, 2009

(51) Int. Cl.
*G01W 1/00*       (2006.01)

(52) U.S. Cl. .................. 73/170.01; 73/170.05

(58) Field of Classification Search .. 73/170.01–170.15
See application file for complete search history.

(56) References Cited

U.S. PATENT DOCUMENTS

| | | | |
|---|---|---|---|
| 6,993,965 B2 * | 2/2006 | Yoshida | 73/170.01 |
| 7,059,833 B2 * | 6/2006 | Stiesdal et al. | 416/41 |
| 7,086,835 B2 * | 8/2006 | Yoshida | 416/9 |
| 7,244,100 B2 * | 7/2007 | Yoshida | 416/9 |
| 7,311,000 B2 * | 12/2007 | Smith et al. | 73/170.11 |
| 7,347,668 B2 * | 3/2008 | Pedersen | 416/1 |
| 7,363,808 B2 * | 4/2008 | Ormel et al. | 73/170.01 |
| 7,420,289 B2 * | 9/2008 | Wang et al. | 290/44 |
| 7,566,982 B2 * | 7/2009 | Voss | 290/44 |
| 2007/0125165 A1 | 6/2007 | Ormel et al. | |

OTHER PUBLICATIONS

"Power Performance Measurements Of Electricity Producing Wind Turbines," International Electrotechnical Commission Standard "IEC 61400-12".

* cited by examiner

*Primary Examiner*—Lisa M Caputo
*Assistant Examiner*—Jermaine Jenkins
(74) *Attorney, Agent, or Firm*—William F. Heinze; Ernest G. Cusick; Frank A. Landgraff (57) ABSTRACT

A system for estimating a freestream wind characteristic for a wind turbine having a rotor includes estimating a nacelle wind speed for the turbine; determining, from the estimated nacelle wind speed, at least one angular position of the rotor for measuring a nacelle wind characteristic for the turbine; and measuring the nacelle wind characteristic at the determined angular position of the rotor.

13 Claims, 7 Drawing Sheets

WIND TURBINE ANEMOMETRY COMPENSATION

BACKGROUND OF THE INVENTION

1. Technical Field

The subject matter described here generally relates to measuring and testing for rate of flow, and, more particularly, to nacelle-to-freestream compensation of wind speed measurements for wind turbines.

2. Related Art

A wind turbine is a machine for converting the kinetic energy in wind into mechanical energy. If that mechanical energy is used directly by machinery, such as to pump water or to grind wheat, then the wind turbine may be referred to as a windmill. Similarly, if the mechanical energy is further transformed into electrical energy, then the turbine may be referred to as a wind generator or wind power plant.

Wind turbines use one or more airfoils in the form of a "blade" to generate lift and capture momentum from moving air that is them imparted to a rotor. Each blade is typically secured at its "root" end, and then "spans" radially "outboard" to a free, "tip" end. The front, or "leading edge," of the blade connects the forward-most points of the blade that first contact the air. The rear, or "trailing edge," of the blade is where airflow that has been separated by the leading edge rejoins after passing over the suction and pressure surfaces of the blade. A "chord line" connects the leading and trailing edges of the blade in the direction of the typical airflow across the blade. The length of the chord line is simply the "chord."

Figure 1:
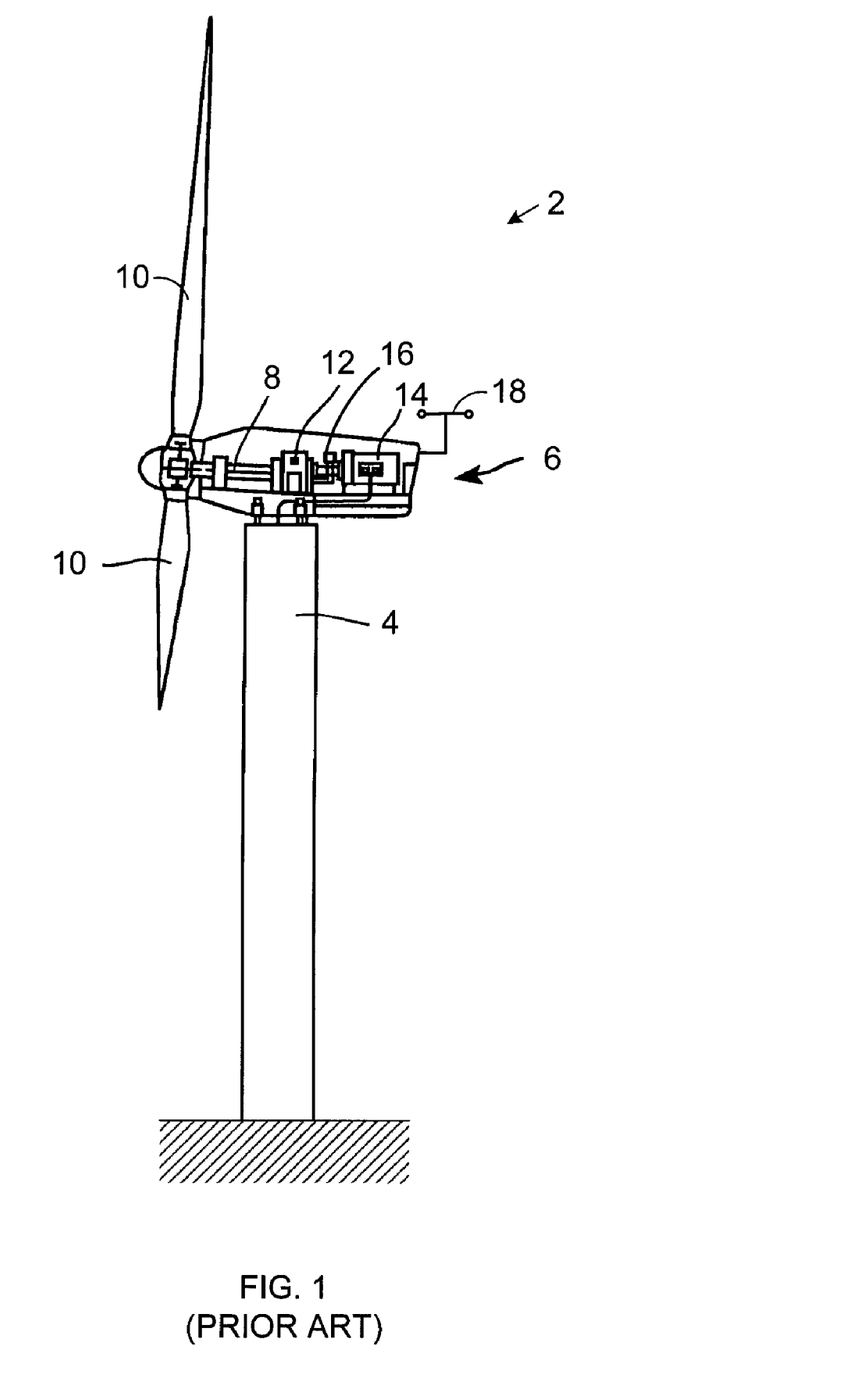
FIG. 1 is a schematic side view of a conventional wind turbine.

Wind turbines are typically categorized according to the vertical or horizontal axis about which the blades rotate. One so-called horizontal-axis wind generator is schematically illustrated in FIG. 1 and available from GE Energy of Atlanta, Ga. USA. This particular configuration for a wind turbine 2 includes a tower 4 supporting a drive train 6 with a rotor 8 that is covered by a protective enclosure referred to as a "nacelle." The blades 10 are arranged at one end of the rotor 8, outside the nacelle, for driving a gearbox 12 connected to an electrical generator 14 at the other end of the drive train 6 inside the nacelle with a control system 16.

In order to prevent damage to the blades, the control system 16 is typically configured to automatically start the wind turbine at minimum wind speeds of about 8 to 16 miles per hour, and then stop the turbine at maximum wind speeds of about 55 miles per hour. In addition, the control system 16 may also be configured to manage various other aspects of wind turbine operation, such as power output, power curve measurement, nacelle yaw, and blade pitch, in response to wind speed and/or other control system inputs. These and/or other aspects of the control system 16 are typically implemented under two broad, and often overlapping, classes of control systems having many variations and combinations: logic or sequential control, and feedback or linear control. However, so-called fuzzy logic may also be used to combine some of the design simplicity of logic control systems with the utility of linear control systems, and vice versa.

Feedback control systems typically include a control loop, with sensors, control algorithms, and actuators, that is typically arranged so as to regulate an operating parameter variable at a setpoint or reference value. So-called "PID control" is a common type of feedback control system that may be applied to wind turbines. "Open-loop" control systems, on the other hand, are used to control wind turbine operation in pre-arranged ways that do not make use of feedback.

Modern control systems 16 for wind turbines 2 are commonly implemented with local and/or remote computers, often as part of a locally embedded control system and/or a wider, distributed control system. These computers are typically configured to emulate logic devices by making measurements of switch inputs, calculating a logic function from those measurements, and then sending the results to electronically-controlled switches. Although both logic and feedback control systems are implemented for wind turbines with programmable logic controllers, the control system 16 may also be implemented with other non-computerized technologies such as electrical or mechanical relays, vacuum tubes, electronic, hydraulic, and/or pneumatic systems, and even simple, periodic manual adjustments.

As noted above, inputs to the control system 16 typically include various wind characteristics such as wind speed and direction taken from an anemometer with a vane. As illustrated in FIG. 1, the anemometer 18 may be mounted on or near the nacelle of the wind turbine 2. For example, the illustrated cup-type anemometer consists of cups at the ends of arms, which rotate when the wind blows. However, other types of anemometers may also be used, including vane-type anemometers, pressure-tube anemometers, hot-wire anemometers, and sonic anemometers.

Figure 2:
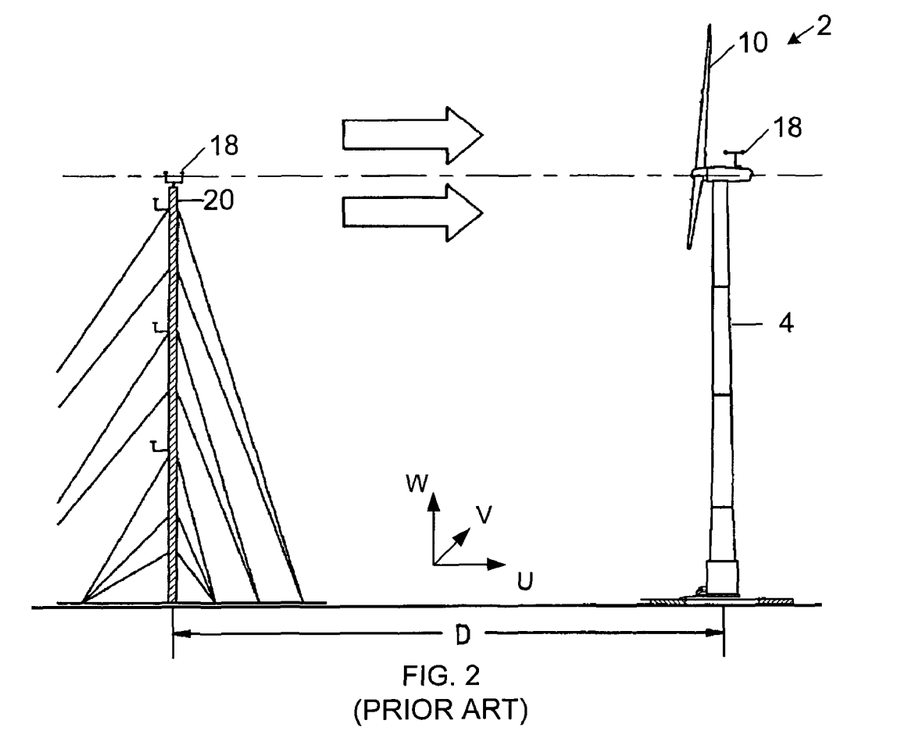
FIG. 2 is a schematic, side view of the wind turbine 2 from FIG. 1 with a meteorological mast.

The "nacelle wind characteristic measurements" that are made using these instruments are subject to a variety of effects that cause inaccuracies, including the turbulent effect of the blades 10 rotating into and out of the fluid flow path of the anemometer 18 and/or vane on the nacelle. Consequently, as illustrated in FIG. 2, an additional meteorological, or "met" mast 20 is sometimes arranged a suitable distance D upwind of the wind turbine 2 for taking "freestream" or "free stream" wind speed and direction measurements which approximate the "true" wind speed and direction that would have been measured at the turbine location had the turbine not been present. In fact, such wind speed and direction measurements are particularly important for "Power performance measurements of electricity producing wind turbines" as described in International Electrotechnical Commission Standard "IEC 61400-12."

U.S. Patent Publication No. 2007/0125165 (from application Ser. No. 11/295,275) discloses a technique for correcting measurement error in data produced by a nacelle-based anemometer and for determining free stream wind speed which uses the following empirically derived formula $$V_{nacelle,corrected} = \left(\frac{a - \sqrt[3]{C_p}}{b}\right) * V_{nacelle,measured} + c$$

where $C_p$ is a power coefficient and a, b, and c represent values associated with aspects of the turbine and operation thereof. However, without the met mast 20, these and other conventional nacelle wind speed error correcting techniques fail to adequately account for the turbulent effects of the blades 10 rotating into and out of the fluid flow path of the anemometer 18 on the nacelle. The relationship between this measured wind speed on the turbine nacelle and the actual freestream wind speed is sometimes referred to as the "nacelle-to-freestream transfer function," or simply the "transfer function."

BRIEF DESCRIPTION OF THE INVENTION

These and other aspects of such conventional approaches are addressed here by providing, in various embodiments, a system of estimating a freestream wind characteristic for a wind turbine having a rotor, including estimating a nacelle wind speed for the turbine; determining, from the estimated nacelle wind speed, at least one angular position of the rotor for measuring a nacelle wind characteristic for the turbine; and measuring the nacelle wind characteristic at the determined angular position of the rotor.

BRIEF DESCRIPTION OF THE DRAWINGS

Various aspects of this technology invention will now be described with reference to the following figures ("FIGS.") which are not necessarily drawn to scale, but use the same reference numerals to designate corresponding parts throughout each of the several views.

DETAILED DESCRIPTION OF THE INVENTION

Figure 3:
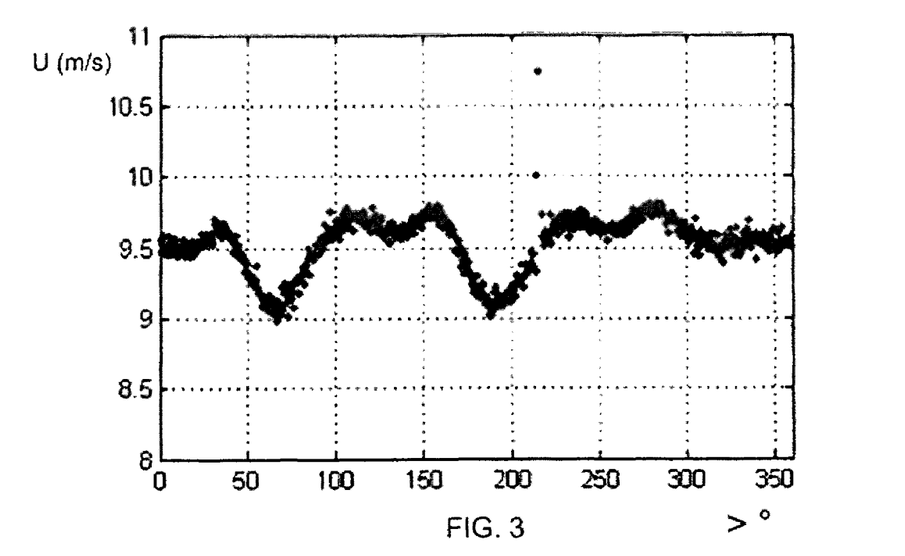
FIG. 3 is a plot of axial nacelle wind speed versus rotor position.
Figure 4:
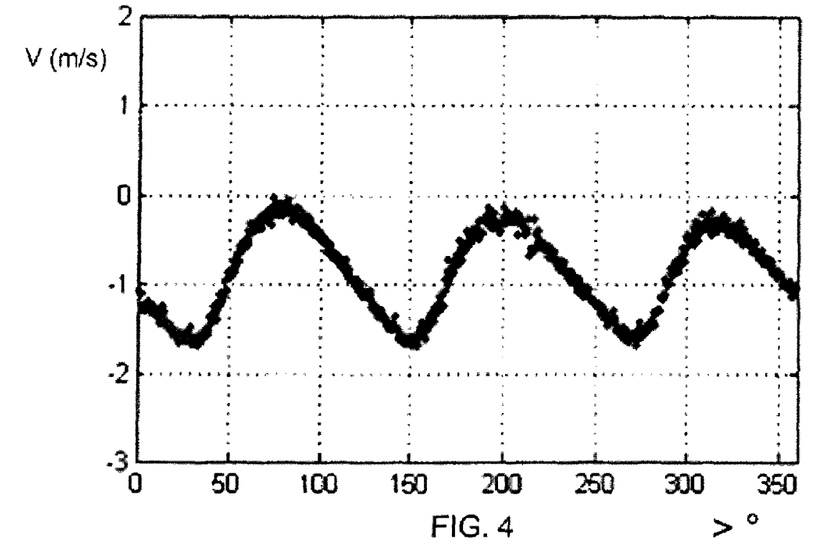
FIG. 4 is a plot of lateral nacelle wind speed versus rotor position.
Figure 5:
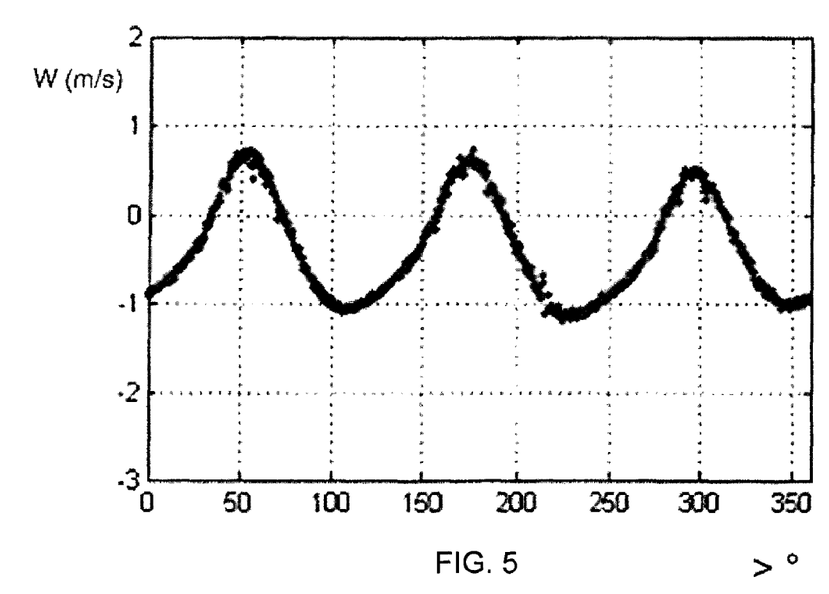
FIG. 5 is a plot of upward nacelle wind speed versus rotor position.

FIG. 3 is a plot of nacelle wind speed along the rotor axis "U" illustrated in FIG. 2 for average axial wind speeds between nine and ten meters per second. More specifically, the plot shows the nacelle wind speed measured with a three-dimensional, sonic recording anemometer along the axis of the rotor as a function of the angular position of the rotor for measurements falling into a "bin" value of between nine and ten meters per second ("m/s") along the rotor axis "U" in FIG. 2. However, other anemometers and/or spatial orientations may also be used. FIGS. 4 and 5 show similar plots of average wind speed measurements along the lateral and upward axes, "V" and "W," identified in FIG. 2 for the same axial wind speed "U" bin of nine to ten m/s. Since the rotor axis "U" may be pitched from horizontal, FIG. 6 further illustrates horizontal wind speed measurements "H" for measured axial wind speeds "U" in the nine to ten m/s bin.

Figure 6:
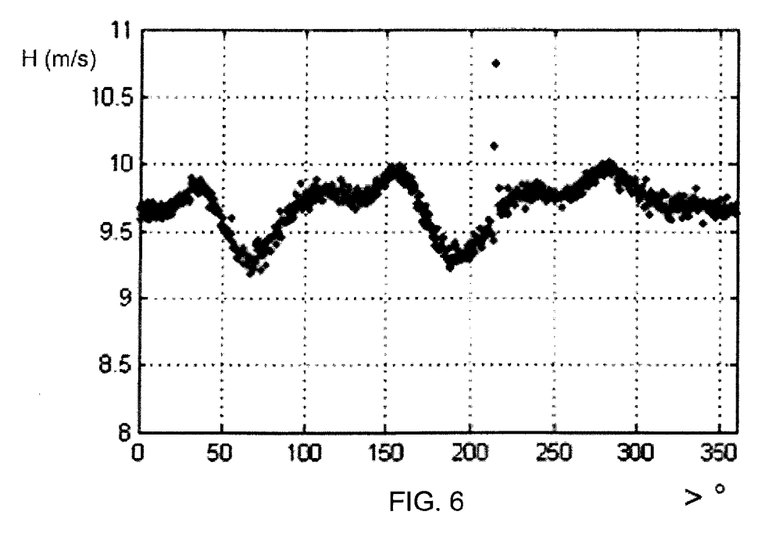
FIG. 6 is a plot of horizontal nacelle wind speed versus rotor position.
Figure 7:
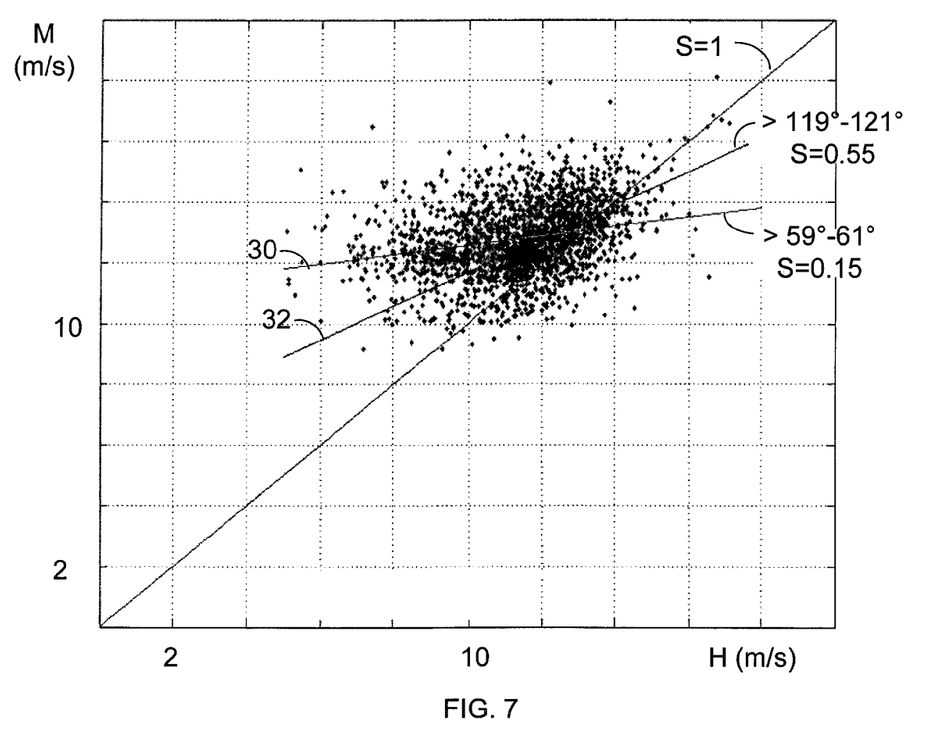
FIG. 7 is a plot of mast wind speed versus nacelle wind speed.

FIG. 7 is a scatter diagram showing measured horizontal wind speed "M" at the meteorological mast 20 for the nine to ten m/s bin, versus the horizontal measured nacelle wind speed "H" from FIG. 6, for all angular positions of the rotor. In this example, mast horizontal wind speed "M" is used to designate a true wind speed. However, other designations of true wind speed may also be used. Preferably, but not necessarily, the true wind speed measurements will be taken in such a way to minimize the effect of the measuring device and/or other external factors on the readings.

FIG. 7 also shows two angular ranges of rotor orientations and the corresponding correlations between "M" and "H" for those ranges. Reference line 30 illustrates a value of slope to be approximately 0.15 for "M"/"H" where the angular position of the rotor is between 59 and 61 degrees. Reference line 32 illustrates a value for the regression coefficient of determination "R-squared" for "M" versus "H" to be approximately 0.55 where the angular position of the rotor is between 119 and 121 degrees. Other correlation may also be used to find and/or rank the correlation between measured and true wind speed for various angular orientation ranges of the rotor including, but not limited to weighted least squares, Chi-square, Point biserial correlation, Pearson's product-moment and/or correlation coefficient, Spearman's ρ, Kendall's τ, polychoric correlation, cross-correlation, autocorrelation, and/or copulas.

Figure 8:
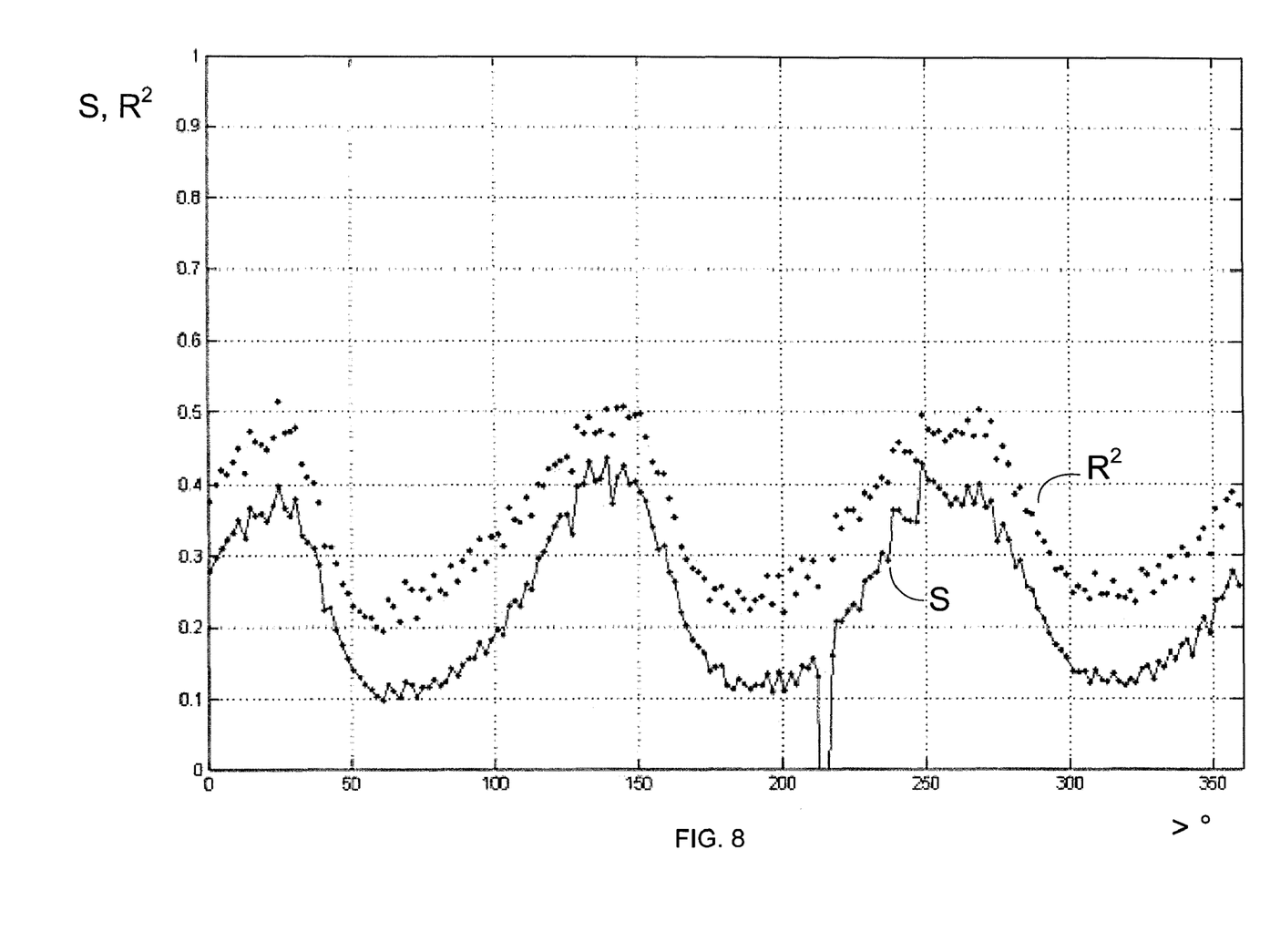
FIG. 8 is a plot of slope and coefficient of determination versus rotor position.

FIG. 8 is a plot of the slope and coefficient of determination discussed above with regard to FIG. 7 for various rotor positions. FIG. 8 illustrates that the maximum values of slope and coefficient of determination for "M" and "H" occur for rotor positions around 20°, 140°, and 260°, where zero degrees is measured with one of the blades arranged substantially vertically. However, other starting positions for determining angular position of the rotor may also be used.

The various measurements and calculations described above may also be conducted for wind direction and/or in connection with other wind speed "bins" besides the nine to ten m/s bin discussed above. When other wind speed bins are considered, the angular position for the maximum (coefficient of determination) correlation between true wind speed and measure nacelle wind speed at other angular positions of the rotor as follows:

| Wind Speed Bin (m/s) | First Position (degrees) | Second Position (degrees) | Third Position (degrees) |
|---|---|---|---|
| 3-4 | 50 | 170 | 290 |
| 4-8 | 40 | 160 | 280 |
| 8-9 | 30 | 150 | 270 |
| 9-10 | 20 | 140 | 260 |
| 10-11 | 10 | 130 | 250 |
| 11-13 | 0 | 120 | 240 |
| 13-14 | 350 | 110 | 230 |
| 14-16 | 340 | 100 | 220 |

The table above illustrates how the angular position of the maximum correlation between measured and true wind speeds decreases (rotates toward zero) for higher wind speeds. Thus, the best correlation between true wind speed and measured nacelle wind speed can be found at certain angular positions that will vary for different ranges of measured nacelle wind speed. Other positions, and/or ranges of position, may also be determined within any acceptable tolerance for the correlation between true wind speed and measured nacelle wind speed that is not necessarily the strongest correlation. These angular positions may also be recalculated for each wind turbine blade configuration, and/or the positions indicated above may be used as a strongest estimate for any wind turbine blade configuration. Similar results are expected for determining the angular positions of the rotor for the best correlation between true wind direction and measured nacelle wind direction and/or other wind characteristics.

On the other hand, the angular positions at which measured nacelle wind speed and direction are least likely to correlate with true wind speed may be determined with the following geometric calculation:

$$d*360*N_r/(v*60),$$

where "d" is the distance between the rotor plane and anemometer, "Nr" is the rotor speed (in revolutions per minute), and "v" is the time average measure of the nacelle wind speed. The other two "influenced positions" at which measured nacelle wind speeds are least likely to correlate with true wind speed are then 120° and 240° after the position indicated by this formula. Conversely, the angular positions at which measured nacelle wind speeds are most likely to correlate with true wind speed can therefore also be determined to occur at 60° before (or after) the influenced positions given by the formula above. Alternatively, the angular positions at which measured nacelle wind speed is most likely to correlate with true wind speed may also be roughly determined to occur for all wind speeds at the 60°, 180°, 300° rotor positions where the blades 10 are positioned farthest away from the flow path of the wind to the anemometer 18.

Figure 9:
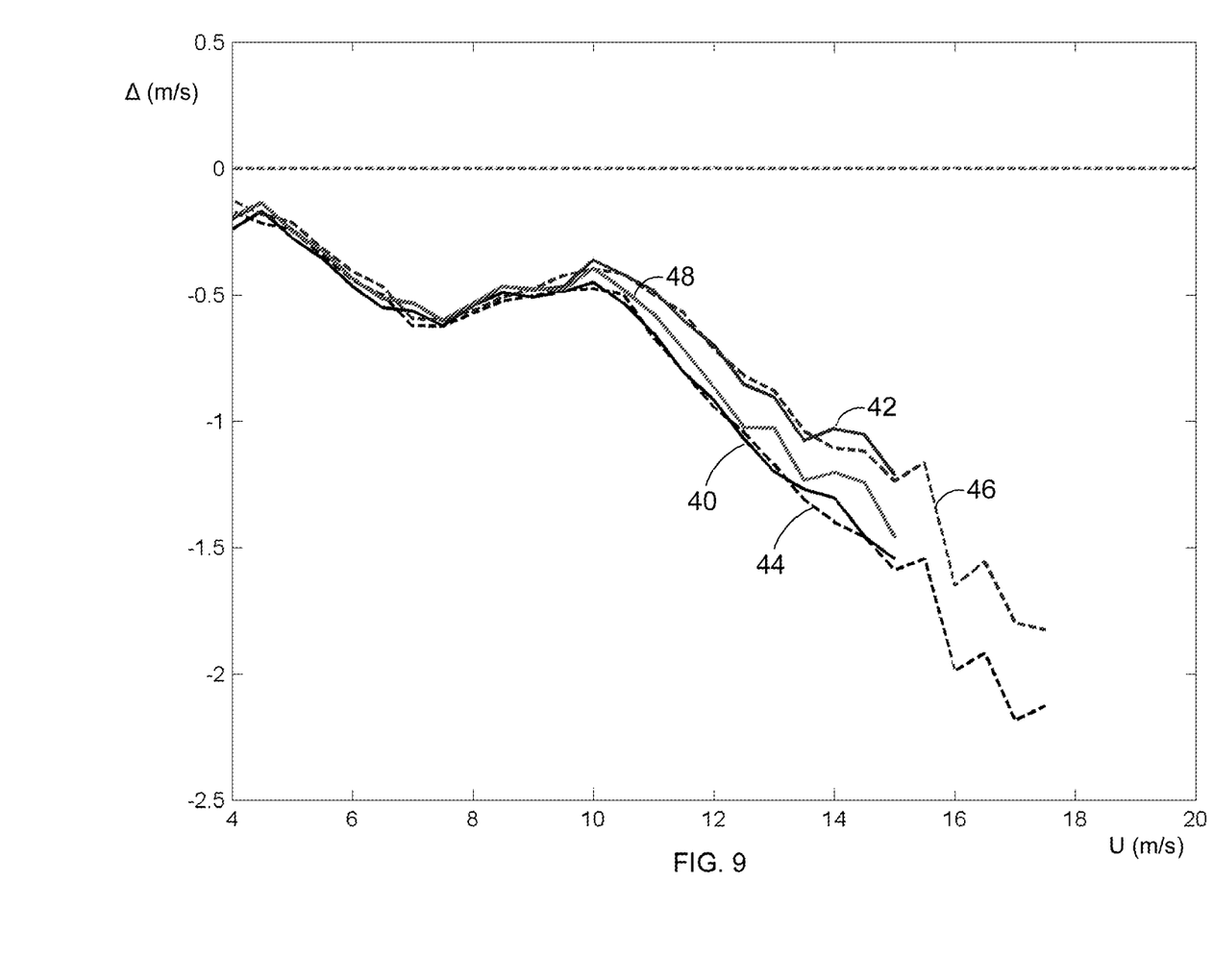
FIG. 9 is a plot of the difference between nacelle wind speed and mast wind speed versus axial nacelle wind speed.

FIG. 9 is a plot of the difference between nacelle wind speed and mast wind speed versus axial nacelle wind speed. In FIG. 9, plot line 40 charts the difference "Δ" between measured nacelle wind speed and true wind speed, versus measured axial nacelle wind speed "U" for the rotor positions listed in the table above. Since some of the data for the 240° position appeared to be in error, several additional data filters are also illustrated in FIG. 9. Plot line 42 illustrates a special case in which the 240° position has been ignored. Plot line 44 illustrates another special case in which a one minute moving average has been applied to the data. Plot line 46 is another special case in which a one minute moving average has been applied to the data and the 240° position has been ignored. Plot line 48 illustrates yet another special case in which only a single measurement is utilized for each angular position.

Figure 10:
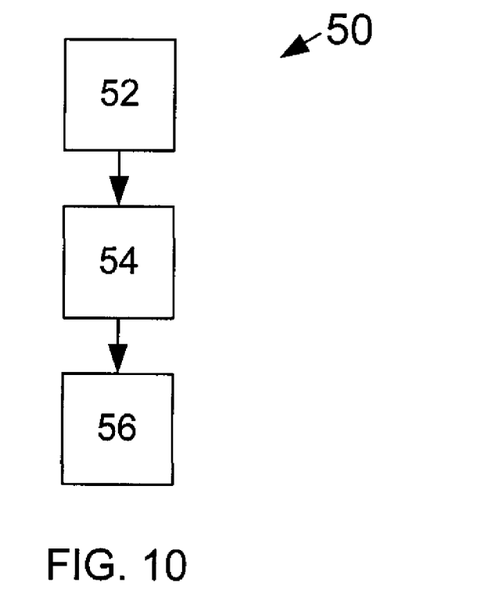
FIG. 10 schematically illustrates a method of estimating a freestream wind speed for a wind turbine having a rotor.

FIG. 10 schematically illustrates a system and method 50 of estimating a freestream wind characteristic for a wind turbine having a rotor. For example, the nacelle wind characteristic may be selected from the group consisting of, but not limited to, wind speed and speed and direction. The flow chart of FIG. 10 shows the general architecture, functionality, and operation of one of many possible implementations of the system and method 50. For example, some or all of the steps for the system and method 50 shown in FIG. 10 may be implemented in software, firmware, and/or hardware which comprises an ordered listing of executable instructions for implementing logical functions. When implemented in software as part of the control system 16 shown in FIG. 1, each block may represent a module, segment, or portion of code, which comprises one or more executable instructions for implementing the specified logical function(s). It should also be noted that in various alternative implementations, the functions noted in the blocks may occur out of the order noted in FIG. 10. For example, two blocks shown in succession in FIG. 10 may in fact be executed substantially concurrently and/or the blocks may sometimes be executed in the reverse or other order, depending upon the functionality involved.

These instructions can be embodied in any computer-readable medium for use by or in connection with an instruction execution system, apparatus, or device, such as a computer-based system, processor-containing system, programmable logic controller, and/or other system that can fetch the instructions from the instruction execution system, apparatus, or device and execute the instructions. This "computer-readable medium" can be any means that can contain, store, communicate, propagate, or transport the program for use by or in connection with the instruction execution system, apparatus, or device. For example, the computer readable medium can be an electronic, magnetic, optical, electromagnetic, infrared, or semiconductor system, apparatus, device, or propagation medium. Other non-exhaustive examples of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In the non-limiting example shown in FIG. 10, the system and method 50 includes a step 52 for estimating a nacelle wind speed and/or other nacelle wind characteristic for the turbine. For example, the nacelle wind speed may be implicitly or explicitly estimated as a roughly constant value over a predetermined period of operation of the turbine. This value can then be modified depending upon the particular season, weather conditions, and/or other local variables. Such periodic estimates of nacelle wind speed could even be made manually by operating personnel.

Alternatively, or in addition, the nacelle wind speed may be estimated by measuring an actual nacelle speed over time, such as by measuring an average nacelle wind speed for multiple angular positions and/or multiple rotations of the rotor. For example, the current nacelle wind speed may be estimated from one or more earlier measurements of actual nacelle wind speed, including those made for one or more of the angular positions of the rotor indicated in the table above.

Another option for estimating nacelle wind speed includes measuring a power output of the turbine, and then imputing a wind speed from a power curve for the turbine. Yet another option for estimating nacelle wind speed includes using the formula $d*360*Nr/(v*60)$ that is discussed above, and/or other calculations, to compute a wind speed "v" from a measured value of rotor speed "Nr" for a given rotor position and distance "d" between the rotor plane and anemometer.

Step 52 of the system and method 50 in FIG. 10 includes determining, from the estimated nacelle wind speed, at least one angular position of the rotor for measuring a nacelle wind characteristic for the turbine. For example, as discussed above, the determining step may include correlating a true wind speed with the nacelle wind speed for each of several angular positions of the rotor; and choosing the at least one angular position based upon the correlation. Any acceptable level of correlation may be used including any of the strongest correlations discussed above. In particular, three angular positions for measuring the nacelle wind speed and/or direction may be determined from the table shown above for any estimated wind speed falling into one of the ranges listed in the left column. In addition to using such a look-up table, similar information could be captured and/or utilized in the form of a function or chart. Alternatively, or in addition, the angular position may be determined from the formula $d*360*Nr/(v*60)$ as discussed above.

Step 54 of the system and method 50 in FIG. 10 includes measuring the nacelle wind characteristic at the determined angular position. For example, nacelle wind speed and/or direction can be measured using a sonic anemometer. However, other suitably fast anemometers and/or vanes may also be used.

Step 56 of the system and method 50 in FIG. 10 includes optionally compensating the measured nacelle wind characteristic in order to arrive at a freestream, or other, wind characteristic. For example, the compensating may include establishing a correction factor for the nacelle wind speed; and adjusting the nacelle wind speed with the correction factor. In particular, a "Δ" value may be associated with the measured nacelle wind speed using any of the plots in FIG. 9. The associated a "Δ" value may then be added to the measured nacelle wind speed in order to arrive at a freestream wind speed. In addition to using the plot shown in FIG. 9, similar information could be captured and/or utilized in the form of a look-up table or function. Alternatively, or in addition, other linear and/or nonlinear relationships may also be implemented for relating measured and compensated wind characteristics, including those disclosed in U.S. Patent Publication No. 2007/0125165 discussed above. Similar types of plots, look-up tables, and/or functions may also be used to convert measured nacelle wind characteristics to other useful forms. The uncompensated measured nacelle wind characteristic may be used directly in making power performance measurements and/or controlling the turbine by compensating other aspects of those systems.

The adjusted nacelle wind speed may be used as an estimate or replacement for freestream wind speed with respect to any aspect of wind technology, including the power performance measurements of electricity producing wind turbines discussed above. The various techniques described above allow for freestream wind characteristics, such as speed and/or direction, to be determined without the need for a meteorological mast 20 that would otherwise be needed in order to account for the turbulent effects of the blades 10 rotating into and out of the fluid flow path of the anemometer 18 on the nacelle. Furthermore, since many wind installations are not provided with a met mast 20, the techniques describe here allow for more accurate power performance (and/or other) measurements to be made with relatively simple modifications to existing electricity producing wind turbines or other facilities.

It should be emphasized that the embodiments described above, and particularly any "preferred" embodiments, are merely examples of various implementations that have been set forth here to provide a clear understanding of various aspects of this technology. It will be possible to alter many of these embodiments without substantially departing from scope of protection defined solely by the proper construction of the following claims.

What is claimed is:

1. A method of estimating a freestream wind characteristic for a wind turbine having a rotor, comprising:
    estimating a nacelle wind speed for the turbine;
    determining, from the estimated nacelle wind speed, at least one angular position of the rotor for measuring a nacelle wind characteristic for the turbine; and
    measuring the nacelle wind characteristic at the determined angular position of the rotor;
    wherein the estimating step comprises
        measuring a power output of the turbine; and
        imputing a wind speed from a power curve for the turbine.

2. The method recited in claim 1 wherein a blade is arranged on the rotor and the nacelle wind characteristic is measured downstream of the blade.

3. A method of estimating a freestream wind characteristic for a wind turbine having a rotor, comprising:
    estimating a nacelle wind speed for the turbine;
    determining, from the estimated nacelle wind speed, at least one angular position of the rotor for measuring a nacelle wind characteristic for the turbine; and
    measuring the nacelle wind characteristic at the determined angular position of the rotor;
    wherein the determining step comprises
        correlating a true wind speed with the nacelle wind speed for each of several angular positions of the rotor; and
        choosing the at least one angular position based upon the correlation.

4. The method recited in claim 3, wherein the choosing step further comprises
    choosing the at least one angular position with the strongest correlation.

5. The method recited in claim 3 wherein a blade is arranged on the rotor and the nacelle wind characteristic is measured downstream of the blade.

6. A method of estimating a freestream wind speed for a wind turbine having a rotor, comprising:
    estimating a nacelle wind speed for the turbine;
    correlating a true wind speed with the nacelle wind speed for each of several angular positions of the rotor;
    choosing at least one angular position of the rotor based upon the correlation; and
    measuring the nacelle wind speed for the chosen angular position of the rotor;
    wherein the estimating step comprises
        measuring a power output of the turbine; and
        imputing a wind speed from a power curve for the turbine.

7. The method recited in claim 6, further comprising the step of compensating the measured nacelle wind speed.

8. An apparatus, comprising:
    means for estimating a nacelle wind speed for a wind turbine;
    means for determining, from the estimated nacelle wind speed, at least one angular position of the rotor for measuring a nacelle wind characteristic for the turbine; and
    means for measuring the nacelle wind characteristic at the determined angular position of the rotor; and
        wherein the means for determining comprises
            means for correlating a true wind speed with a nacelle wind speed for each of several angular positions of the rotor; and
            means for choosing the at least one angular position based upon the correlation.

9. The apparatus recited in claim 8, wherein the means for choosing comprises means for choosing the at least one angular position with the strongest correlation.

10. The apparatus recited in claim 9 wherein the means for estimating comprises means for measuring an average nacelle wind speed for multiple angular positions of the rotor.

11. The apparatus recited in claim 9 wherein the means for estimating comprises
    means for measuring a power output of the turbine; and
    means for imputing a wind speed from a power curve for the turbine.

12. The apparatus recited in claim 10 wherein the nacelle wind characteristic is selected from the group consisting of speed and direction.

13. The apparatus recited in claim 12 wherein the nacelle wind characteristic is speed.

* * * * *